United States Patent [19]
Walker et al.

[11] Patent Number: 5,664,010
[45] Date of Patent: Sep. 2, 1997

[54] SYSTEM AND METHOD FOR PROVIDING AN IMPROVED TELECOMMUNICATIONS SERVICE NODE

[75] Inventors: Thomas G. Walker, Bound Brook, N.J.; Darren Goos, Carrollton; Raymond E. Bernritter, Dallas, both of Tex.; Robert S. Lee, Rockaway, N.J.; Mark I. Finkelstein, Conyngham, Pa.; Ross Ginsberg, Livingston, N.J.

[73] Assignee: Electronic Data Systems Corporation, Plano, Tex.

[21] Appl. No.: 368,525

[22] Filed: Jan. 4, 1995

[51] Int. Cl.$^6$ .................................................... H04M 3/42
[52] U.S. Cl. ........................... 379/207; 379/67; 379/210; 379/230
[58] Field of Search ................................ 379/67, 88, 89, 379/201, 207, 210, 211, 212, 213, 229, 230

[56] References Cited

U.S. PATENT DOCUMENTS

| | | | |
|---|---|---|---|
| 5,418,844 | 5/1995 | Morrisey et al. | 379/207 |
| 5,469,500 | 11/1995 | Satter et al. | 379/207 |

OTHER PUBLICATIONS

"Transparent Message Routing Between An SS #7 Network and X.25 Network", IBM Technical Disclosure Bulletin, vol. 35 No. 3, Aug. 1992.

*Primary Examiner*—Fan Tsang
*Attorney, Agent, or Firm*—L. Joy Griebenow

[57] ABSTRACT

The system and method of the present invention provides an improved service node containing at least one service application, a conversion process and a TCP/IP service circuit handler for communicating with a TCP/IP-driven external peripheral device over a communications link. According to a preferred embodiment, by selecting a switch as the TCP/IP-driven external peripheral device, the call capacity of the improved service node can also be increased. This is preferably accomplished by receiving an incoming call into the external switch, notifying the improved service node of the incoming call, and creating an instance of the service application on the service node, which service application is associated with the incoming call. The service application requests the switch place a corresponding outgoing call—which it does. The switch then hairpins the incoming and outgoing calls together and notifies the service application of their connection. The improved service node then tears down its instance of the call, thereby releasing the associated memory supporting the instance, as well as the connection (but not the communication link) between the service node and the switch, all without disturbing the hairpinned calls. The hairpinned calls remain stored in the switch fabric of the external switch until one of the hairpinned calls reports an on-hook condition.

13 Claims, 2 Drawing Sheets

SYSTEM AND METHOD FOR PROVIDING AN IMPROVED TELECOMMUNICATIONS SERVICE NODE

BACKGROUND OF THE INVENTION

1. Field of the Invention

The present invention relates generally to telecommunications systems, and more particularly to a system and method for providing an improved service node with increased telecommunications capabilities.

2. Summary of the Related Art

To achieve the increasingly complex functions demanded by today's telecommunications users, there are an ever-increasing number of service applications which provide more and more sophisticated functions. To accommodate these powerful and persistent service applications, service nodes were developed as platforms on which these service applications could reside. An example of such a service node would include the service circuit node developed by AT&T, as a part of their Advanced Intelligent Network (A-I-Net™ or AIN) technology.

A service node typically accepts telephone traffic at its various ports and creates an instance of the requested service application upon receipt of each incoming call. Depending upon the particular service application involved, the service node uses its voice processing facilities to obtain information about the call routing, then dials the telephone number desired by the caller, and hairpins the incoming and outgoing calls together to connect the incoming user's call with his expected destination. The incoming call remains on the service node's switch fabric port during connection, as well as during the entirety of the call. Service node memory is also tied up in maintaining the instance of the particular service application associated with each call from reception of the incoming call until one of the phones returns to its on-hook status. When one of the parties goes back on-hook, the service node breaks down the service application instance and frees up the respective service node switch fabric ports.

An example of a service application which runs on a service node could be a single number reach-type application which allows a subscriber to provide a single telephone number by which he can be reached. This AIN service application allows a subscriber (sometimes also referred to as a "user" herein) to define a custom call-routing schedule and directory that enables the subscriber's calls to find him anywhere. The directory defines locations, such as "office" or "car", and associates each location to a directory number. The schedule identifies a subscriber's location based on time of day and day of week. Such a program enables a subscriber to distribute a single or "universal" phone number; when a call is placed to that number, the service application is responsible for managing the actions needed to find the subscriber based on his personalized directory and schedule and route calls to him. There are several companies that offer a single number reach-type product implemented on a service circuit node, such as AT&T's Personal Number, and Universal Number™ produced by Electronic Data Systems Corporation (assignee of the present invention).

Unfortunately, the service node has at least two limitations: low call capacity and no capability to communicate with an external TCP/IP-driven device. A service node's call capacity typically is approximately 200 concurrent calls. As demand for a particular service application increases, or traffic generally picks up, the service node's call capacity becomes a serious limitation. Also, as described above, since every instance of a service application remains for the entire duration of its associated call, more and more service node memory remains necessarily unavailable for additional service applications or their increasingly sophisticated functionality(ies) which demand increasing amounts of existing service node memory.

SUMMARY OF THE INVENTION

In view of the above problems associated with the related art, it is an object of the present invention to provide a system and method for an improved service node with increased call capacity.

Another object of the present invention is to provide a system and method for an improved service node with TCP/IP communication ability to enable the node to communicate with external TCP/IP-driven devices or hosts.

One embodiment of the present invention achieves these objects by providing a service node containing at least one service application, a conversion process and a TCP/IP service circuit handler for communicating with a TCP/IP-driven external peripheral device over a communications link. The conversion process converts commands received from the service application and then forwards them to the TCP/IP-driven external peripheral device via the TCP/IP service circuit handler. Reports received from the periphery device via the service circuit handler are also converted by the conversion process and sent to the respective service application. The conversion process also keeps a linked list of "call"-specific data for use during call instance teardown and during "second dial tone" processing.

To increase the call capacity of the service node, the present invention preferably employs an external switch as the external host. This permits the service node to "park" a call between two users in the switch fabric of the associated external switch for the duration of the telephone call. The incoming call is routed through the external switch and forwarded directly to the service node for processing. The outbound call is also made through the associated external switch without using the service node's switch fabric. The inbound and outbound calls are then hairpinned together and the connection between callers is complete. As a result of this arrangement, the service node can tear down its instance of the call, thereby releasing the associated memory running the front end processes, and the connection between the service node and the external switch is also released, all without disturbing the connected callers. The call continues on the external switch; when it ends, the service node is notified for possible further processing.

A further advantage of employing the present invention in a service node, together with an external switch, is that a service node can now handle international traffic of all types and can also interface with international, as well as domestic, signalling data networks.

These and other features and advantages of the invention will be apparent to those skilled in the art from the following detailed description of preferred embodiments, taken together with the accompanying drawings, in which:

DETAILED DESCRIPTION OF THE PREFERRED EMBODIMENT

A preferred embodiment of the present invention consists of two parts within a service node: a TCP/IP service circuit handler and a conversion process. Such invention has been implemented on an AT&T service circuit node, although other service nodes could be used. The TCP/IP SCH handles all of the UNIX socket communications between a service node (SCN) and an external TCP/IP circuit device or host such as a specialty digital switch (hereinafter referred to as "SDS"). The conversion process of the present invention handles all of the conversion of commands and reports between the service applications and the external peripheral device (e.g., SDS).

Figure 1:
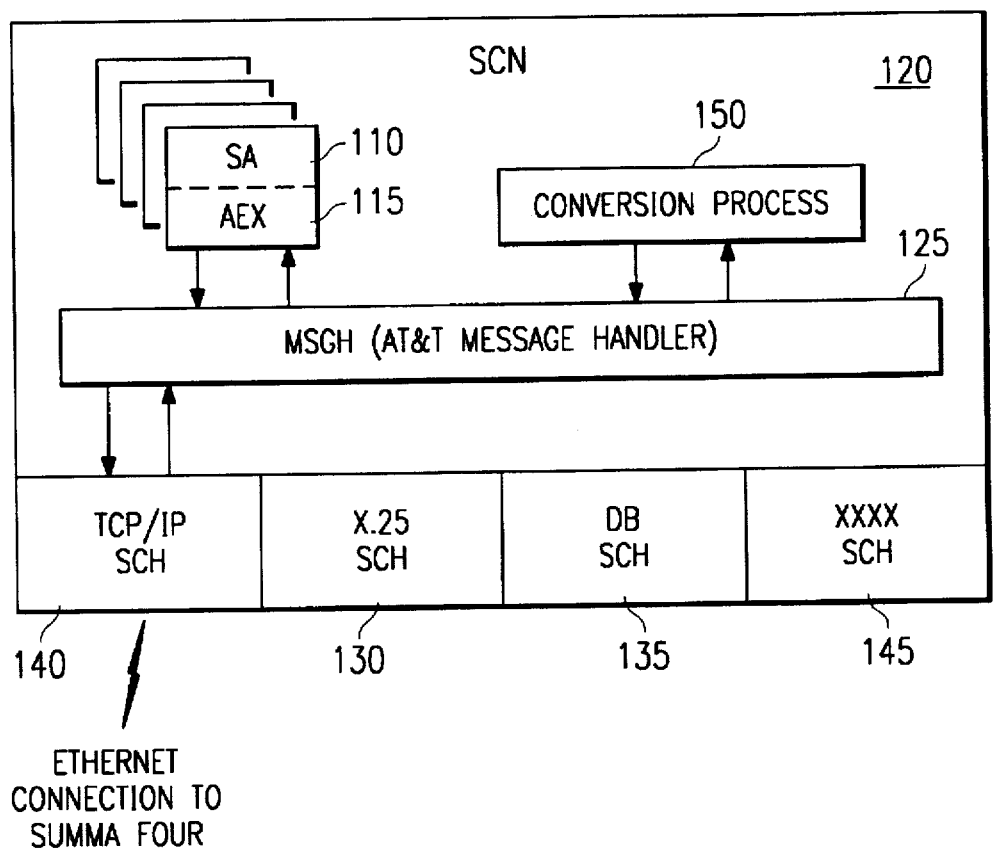
FIG. 1 is a block diagram illustrating a preferred embodiment of the present invention within a typical service node.

FIG. 1 is a block diagram representing a typical service node 120 (hereinafter referred to as "SCN 120") which is shown to include a preferred embodiment of the present invention therein. Within SCN 120 there is at least one service application (hereinafter referred to as "SA") 110, at least one action executor ("AEX") 115, at least one message handler ("MSGH") 125, an internal switch fabric (not shown), other processes which are not relevant to the understanding of the present invention and therefore will not be further discussed herein, and other service circuit handlers 130,135,145 which, though not pertinent to the present invention's system or method, are shown for sake of clarity. SCN 120 is preferably composed of a plurality of UNIX processes that function independently or as a group to perform Advanced Intelligent Networking (AIN) activities. SA 110 is the intelligent part of the AIN. AEX 115 is typically not a separate process from SA 110, but is compiled together with SA 110 to function as a single process. All processes within SCN 120 communicate with each other by using message handler ("MSGH") process 125.

As mentioned above, there are many SAs in today's telecommunications market providing numerous services and capabilities for their subscribers. It should be understood that although the present invention will be discussed in terms of a single number reach-type service packaged application ("SPA") as the referenced SA, this is for illustrative purposes only and should in no wise limit the scope of the present invention.

Consider for the moment FIG. 3, which is a block diagram representing how service circuit handler 140 (hereinafter referred to as "SCH 140") preferably operates within a service circuit node environment, such as SCN 120. As is apparent, conversion process 150 and TCP/IP SCH 140 have been added to SCN 120. At any given time there may be more than one SA communicating with a single SCH 140. When an SA 110 needs to communicate with SCH 140, it formats an action message and the AEX 115 portion of the particular SA 110 writes the message to MSGH process 125. MSGH process 125 routes the SA's message to the destination specified in the message header, in this example SCH 140, via conversion process 150. SCH 140 receives the message request and sends it out to an external peripheral resource 160 such as a specialty digital switch (hereinafter referred to as "SDS 160") such as is produced by Summa Four, using TCP/IP sockets over an Ethernet connection. It should be understood that although the present invention is described herein for ease of discussion as a T1 specialty digital switch, the present invention could also enable a service node to handle, among others: ISDN, ATM, SONET, voice or data, bridges, routers, b-routers, frame relay, domestic-capable, and international-capable switching traffic. It should also be understood that although the present invention is described herein as implemented using an Ethernet communication media, the present invention should in no wise be limited to an Ethernet, as it could instead use any standard communication media such as ATM, SS7, FDDI, etc. SDS 160 returns a response to SCH 140 which in turn sends the response back to SA 110 through conversion process 150 to AEX 115 via MSGH process 125. Conversion process 150 converts SA action requests into commands the TCP/IP host will understand, in this case, the switch SDS 160. It is also responsible for storing information for the "life" of a call. On the return path, conversion process 150 converts an SDS 160 report into an SA 110 event message.

TCP/IP SCH 140 operates as a control computer for SDS 160. Any reports sent from SDS 160 to SCN 120 are received by SCH 140 and forwarded to conversion process 150. Conversion process 150 may internally act upon a received report or may forward the report to a designated SA 110. Any communication from an SA 110 to SDS 160 occurs through SCH 140. All communications between SCH 140 and external TCP/IP-driven host SDS 160 are preferably performed over two Ethernet connections, to allow for redundancy or "hot" backup. It should be understood that such communications can also be performed over a single Ethernet connection. The problems with this latter approach is that if the Ethernet card on SDS 160 or SCN 120 fails then there is no way to communicate between them. Thus, if the single TCP/IP connection fails then all communications between machines is lost.

The obvious advantage to using a second or redundant "hot" link to (standby) SDS 160 is to recover from communications and hardware problems. When TCP/IP SCH 140 initializes, when there is only one communications connection, it connects to the primary side of SDS 160. However, if a second communications connection exists, when TCP/IP SCH 140 initializes it will also connect to the standby side of SDS 160 and the connection will always remain active. Thus, with the latter arrangement, if a communications problem occurs on the primary connection between SDS 160 and SCN 120, SDS 160 will preferably automatically switch to its standby side and notify conversion process 150 via LWP 175 that a switch has occurred. Conversion process 150 interprets the report from SDS 160 that a switch has occurred, and it in turn notifies SCH 140 of the switch. Once SCH 140 has been notified, the standby side becomes the primary side. SA 110 remains unaware that these problems have occurred, and it will go about its business normally.

Figure 2:
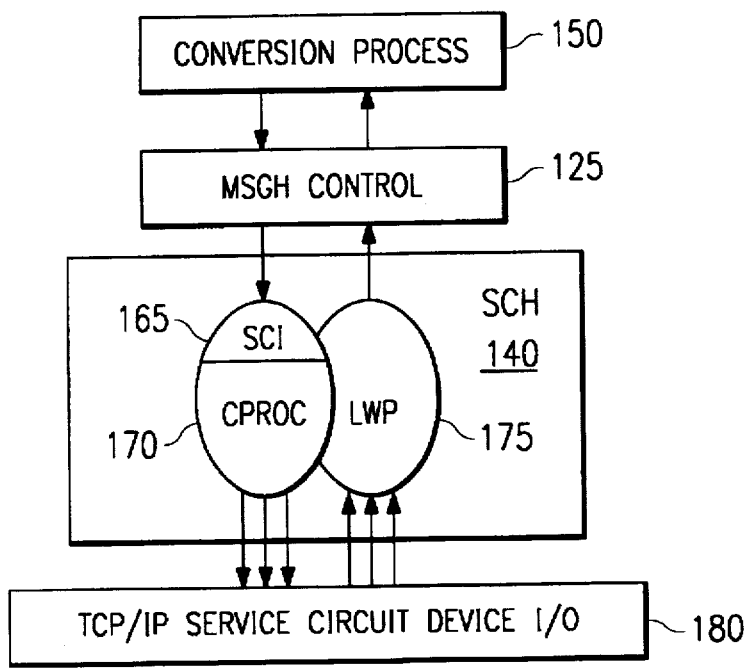
FIG. 2 is a block diagram illustrating a preferred embodiment of the present invention in more detail.

FIG. 2 is a block diagram illustrating a preferred embodiment of the present invention including TCP/IP SCH 140 (in terms of (PROC 170, LWP 175) and conversion process 150. TCP/IP SCH 140 is preferably a software program written in C++ that provides real time control, resource management, maintenance control, and fault reporting for a TCP/IP service circuit. SCH 140 is responsible for controlling and maintaining the peripheral resource (which in the particular preferred embodiment of the present invention illustrated in FIG. 2 is a specialty digital switch, but which could also be a pager, voice mail, a billing system, a remote processing computer (RPC) or auxiliary computing system, a cellular short messaging system, a wireless data system, a data storage device, an electronic mail system or other external TCP/IP-driven host). SCH 140 is implemented as generically (and modularly) as possible to allow it to be used for other applications needing to use TCP/IP to communicate to other external hosts.

SCH 140 preferably consists of a single UNIX process within which there is a control process ("CPROC") 170 which is preferably a heavy weight process, and light weight process ("LWP") 175, managed by the control computer (CC; not shown). A heavy weight process has a separate address space so that it can be switched in, or out, of the address space. LWP 175 is a subprocess or "thread" that shares CPROC 170's address space so that context switching of LWP 175 is very fast. LWP 175 controls CPROC 170 until LWP 175 voluntarily relinquishes control by performing a hard break or blocking on a read. The CPROC receives messages through a service circuit interface ("SCI") 165 requesting access to the Ethernet service circuit, while LWP 175 reads messages from the service circuit. CPROC 170 also reports hardware errors for the service circuit.

LWP 175 reads from the UNIX sockets that were opened by CPROC 170. The UNIX function poll is used to determine if there is a socket to be read and if so, the LWP 175 reads all the sockets in a single sweep. For example, in the AT&T SCN environment, an LWP cannot perform a blocked read or the entire process (HWP and LWP) will relinquish its time slice. To prevent the LWP process from blocking, it will set a timer and poll the UNIX sockets for new messages. Any new messages received on the Ethernet socket will be forwarded to conversion process 150 using MSGH process 125.

Messages are passed between SA 110 and SCH 140 by SCI 165. SCI 165 is a set of UNIX functions that provides the basic functionality used by all SCHs 140. It provides common, standardized communication and control software between SCHs 140 and other SAs 110. The SCI code is compiled with SCH 140's code, and runs in its process; there is no separate SCI 165 process. SCI 165 controls SCH 140's message queue, reading the messages, interpreting them, and passing them to SCH 140 software. Each SCH 140 preferably has only one message handler subsystem (MSGH) queue, which is maintained by SCI 165.

SCH 140 is responsible for reading from and writing to a service circuit. CPROC 170 uses MSGH process 125 to receive and process messages from conversion process 150. SDS-specific messages are written directly out the UNIX socket to SDS 160. LWP 175 receives messages from the Ethernet communications connection and forwards them to conversion process 150. Reports received from SDS 160 are then forwarded back to SA 110 as event messages.

Control process (CPROC) 170 compiles the SCI library within its code. SCI 165 communicates with any process running on SCN 120 that uses MSGH process 125 to send and receive Inter-Process Communication (IPC) queue messages. For example, a message that needs to be forwarded to TCP/IP SCH 140 comes into CPROC 170 from conversion process 150, using SCI 165. CPROC 170 is blocked on a read to MSGH 125 queue, forwarding SDS-specific messages out the UNIX socket. LWP 165 handles the reads from the TCP/IP service circuit. Any response from the TCP/IP service circuit is received by LWP 175 and is sent to conversion process 150 using MSGH process 125. A single LWP 175 preferably handles one to n specialty digital switches (or other TCP/IP-drive systems and devices) external to SCN 120 with one socket for each SDS 160 attached to SCN 120.

LWP 175 shares the memory segment of CPROC 170 and therefore has access to the class that established the socket connection to SDS 160. LWP process 175 does not have the same restrictions as CPROC 170, in the sense that it must provide functions with specific names that the INIT process will call in a particular order. LWP 175 defines an entry point function to SCI 165 and the INIT process calls the LWP entry point function after CPROC's procinit function has completed. When LWP 175 starts, the following functions are executed:

The initialization function is responsible for getting socket information from the class that established the initial connections with SDS 160. After getting the socket information, the 'C' structures necessary to use the UNIX poll function are filled out.

The main execution function will be responsible for reading the UNIX sockets, setting a timer, and sending messages to conversion process 150 with data received from the socket. The first step is to poll the UNIX ockets to check if there is a new message to read. If there is a new message, LWP 175 reads the socket and sends the data to conversion process 150. Regardless if there was a new message to read, the LWP 175 process is put to "sleep". Putting the process to "sleep" is necessary to allow the CPROC a time slice to retrieve a message from its message queue. When the LWP timer expires, the sockets are polled again. The cycle continues until CPROC 170 shuts down.

CPROC 170 is responsible for receiving action messages from conversion process 150 and sending those actions on the TCP/IP service circuit. If the message type received is directed to the TCP/IP service circuit, then the message is written directly out the UNIX socket to SDS 160. The main responsibility of CPROC 170 is to establish a connection to SDS 160. This process is running under the control of an INIT process, and if it aborts it will automatically be restarted.

Configuration data to be used by SCH 140 is provided within an ASCII flat file that is read at startup time. Due to any inability to provide the location of the configuration file within a command line, there is preferably a hidden file in the root directory that contains the location of the actual configuration file. The hidden file contains the fully qualified directory and file name of the configuration file for the SCH.

One type of input parameter to SCH 140 is for configuration data that TCP/IP SCH 140 needs to do its job. Configuration data preferably includes data that is unique to each installation of the TCP/IP SCH 140 on each SCN 120. For example, LWP 175 needs the address of the SDS 160 Ethernet board slot. The configuration parameters for SCH 140 are preferably stored within an Oracle database or an ASCII flat file. The following are descriptions of example configuration parameters for TCP/IP SCH 140:

HostName—This field indicates the remote host name to be retrieved from the/etc/host file. The name in the/etc/host file preferably has a numeric after the name, i.e., Summa 1. If there is a primary and secondary Ethernet connection the name might, for example, be Summa1a and Summa1b.

RedundantHost—This field indicates if the remote host has redundant Ethernet capabilities. For example, a '1' indicates YES and '0' indicates NO.

ReconnectTimer—This field indicates the amount of time to wait before trying to reconnect to a host that failed to connect during initialization. This field is typically measured in seconds. An example valid range might be from 0 (zero) to 1800 seconds (30 minutes).

EthernetPollTimer—This field indicates the amount of time to wait between checking the Ethernet socket between the external host and SCN 120 for new data. This field is typically measured in milliseconds. An example valid range is from 1 to 20000 milliseconds.

SocketReadAttempts—This field indicates the number of consecutive reads to perform against a single socket before returning from the READ function. If there is no data in the socket the function will return. An example valid range is from 1 to 20 reads.

PingTimer—This field indicates the amount of time to wait before trying to 'ping' the remote host. This field is typically measured in seconds. An example valid range is from 0 (zero) to 300 seconds (5 minutes).

Port—A list of all the valid socket names on the external host, in this case, SDS 160. There can be multiple Port parameters. The field is preferably numeric.

A copy of an actual TCP/IP SCH configuration file can be found in Appendix A attached hereto. A copy of example classes preferably used within the SCH 140 process is attached hereto as Appendix B.

Another type of input to TCP/IP SCH 140 are user interface messages. These messages are used for debugging SCH 140. A further input to SCH 140 are system messages such as process shutdown. When SCH 140 receives this message, CPROC 170 closes all files, detaches from shared memory and exits.

Other input parameters to SCH 140 are IPC messages which are passed from conversion process 150 to CPROC 170, via MSGH process 125. TCP/IP SCH 140 preferably only communicates with conversion process 150. This means messages received from other subsystems within SCN 120 will preferably be ignored. The destination of an IPC message is determined by an nsHost parameter. The spData field is a block of data and is not interrogated by TCP/IP SCH 140.

nsHost—is a number that indicates to which relative socket the data portion of this message is be written. There can be from 1 to n number of sockets open. Conversion process 150 determines to which relative socket, or host, the data should be written.

nsLength—The length of the data portion of this message.

spData—The actual data that is going to be transmitted out the UNIX socket. The data may have non-printable characters.

The main outputs from SCH 140 involve IPC messages passed between CPROC 170 and conversion process 150. TCP/IP SCH 140 preferably only sends messages to conversion process 150. For example, the message ID TcpConvertMsg is sent by LWP 175 when reading a message off a socket from the Ethernet port. The destination of the message is preferably always conversion process 150. The nsHost parameter is determined by which socket was read.

nsHost—is a number that indicates which relative socket the data portion of this message came from. Conversion process 150 determines which associated SA 110 should receive the data.

nsLength—is the length of the data portion of this message.

spData—is the actual data that came from the UNIX socket. The data may have non-printable characters.

Conversion process 150 is responsible for converting any SA-formatted message to a format that an external host can support. Conversion process 150 also converts reports received from the remote host (e.g., SDS 160) to a format that SA 110 can understand. It is also responsible for keeping a linked list (also referred interchangeably with "tree" herein) of "call" specific data because it is a permanent process that is not removed from memory between SA 110 call instances.

Conversion process 150 runs under an INIT subsystem of SCN 120. In addition to various strictly administrative processes, conversion process 150 preferably registers itself with the MSGH 125 system, retrieves the queue number of TCP/IP SCH 140, reads the configuration file, attaches to shared memory, initializes shared memory if the run level is 2 or higher, and initializes the Btree, COcallInfo and COswitch classes in shared memory.

Conversion process 150 also checks every message type it receives and performs actions depending on the message types. For example, if it receives "TcpConvertMsg" as a message type, conversion process 150 sets pCallInfo and pMsg in switch instance and calls processMsg method for the switch instance. Some of the messages received may be requests for information, therefore not requiring interaction with the service circuit. Thus, if conversion process 150 receives a message type that is an action request for call information, conversion process 150 attempts to locate the call by finding its respective outgoing port in the outgoing port list for each SDS 160 where, with the present discussion a single number reach-type application is SA 110, the universal number field matches. If it finds a match, it sets the pCallInfo and pMsg attributes in switch instance and calls processMsg method for the switch instance. If it is not found, it sends back an appropriate fail message to the inquiring SA 110.

As with TCP/IP SCH 140, at any given time there may be multiple SAs communicating with conversion process 150. Process 150 receives the action messages from SA 110, formats a command for SDS 160 to understand, and sends the command to TCP/IP SCH 140. SCH 140 in turn writes the message out to SDS 160 using TCP/IP sockets over an Ethernet connection. Any response returned from SDS 160 will be sent back through TCP/IP SCH 140 (via LWP 175) to conversion process 150. Conversion process 150 will convert the message into an event and forward the event to AEX 115. All messages are passed using MSGH process 125.

Specifically, conversion process 150 uses the MSGH library to receive and send messages to the AEX 115 and SCH 140 processes. Conversion process 150 keeps an internal list of all active calls. This list contains specific information about switch remote host (SDS 160) and ports utilized, the call's state and the AEX call id (which is used to tell AEX 115 for which call an event has been received and information on any outstanding action).

When an action is received from AEX 115 for SDS 160, conversion process 150 locates the associated instance of the call and formats a command to the corresponding SDS 160. When a report from SD 160 is received, conversion process 150 parses the message and determines if the message needs to be passed as an event to an AEX. A report will only be formatted into an event if its corresponding call is on the active call list and there was an outstanding action for the call, that was fulfilled by the report received.

Conversion process 150 can handle interfacing with multiple SDS 160 switches and SA 110/AEX 115 applications simultaneously. Moreover, conversion process 150 handles all remote host (e.g., SDS 160) specific tasks, so that SA 110 and AEX 115 need not know what type of switch they are communicating with, thus adding a layer of modularity for ease of upgrade. Conversion process 150 is preferably structured such that new switches and other peripheral devices may be added easily without modifying existing classes.

There are preferably six main object-oriented classes employed by conversion process 150, namely: COshmem, COshmemObj, Btree, COcallInfo, COswitch, and COSDSswitch classes. As before, it should be remembered that these class names are merely design choices and should in no way limit the scope of the present invention. Briefly, the COshmem class is the interface to the shared memory segment used by conversion process 150. The COshmemObj class is used in conjunction with the COshmem class to define each object type in shared memory. The Btree class defines binary trees used for storing information. Each entry in each tree is preferably an index (usually a switch port or callid), and a pointer to data. These trees are used to rapidly find a call instance. The COcallInfo class contains information about each call. The instances of the COcallInfo class are preferably contained in lists within the COswitch class. The COswitch class is preferably a base class that contains information about a generic switch. Each switch type has its own inherited class using the COswitch class as its base. For example, the COSDSswitch class is inherited from the COswitch class; therefore it interprets switch-specific reports and formats switch-specific commands.

More specifically, the COshmem class manages the shared memory for conversion process 150. Conversion process 150 stores all information concerning all associated SDS 160 (switches), the active calls and Btree nodes in shared memory. Thus, if conversion process 150 dies, it can restart without losing any information.

The Btree class is used to define and manage binary trees. Several binary trees are used in the conversion process, so that the look-up of call instances is very fast. Each entry (datum) is defined by its key and has a pointer to a user defined data block. In the case of the conversion process, the data pointer always points to the COcallInfo block for the associated call.

The COcallInfo class contains all the information associated with a particular call instance. When an external host (e.g., SDS) sends a report resulting from an incoming call, a call instance is created; when an on-hook report is received for the incoming call, the call instance is removed. The call instance is stored in the pCallList tree for the switch on which the call is active. When a report is received from SDS 160, it is matched to its respective call instance by the incoming port or outgoing port. These values are associated to the call instance in the call list and outgoing port list. The majority of manipulation of the call instances occurs in connection with the COSDSswitch class.

The COswitch class contains information about each switch. It is preferably used as a base class for each type of switch the conversion process 150 may handle. Thus, any new switch type (e.g., SDS 160) will also be inherited from this base class. The inherited classes may not contain attributes, because they must be the same size as the base class, because base class object types are defined in shared memory. The following are examples of static attributes which may be declared, since they do not change the size of an instance of the class. Again recall, attribute names and action names are matters of design choice and should not in any way limit the scope of the present invention.

The pCallList attribute contains a pointer to the base of the tree that contains all active calls for this switch. They are stored in a tree so that they made be retrieved quickly. Each call instance is of type COcallInfo. The calls are stored using the incoming port as the primary key. If a call has two incoming ports (one from the caller and one phantom), two entries reside in the tree, but they refer to the same call instance.

The pOportList attribute contains a pointer to the base of the tree that contains all active outgoing ports. They are stored in a tree for quick retrieval, preferably using an outgoing port as the primary key and, if a call has multiple outgoing ports (such as a T1 connection with the SCN and a port used to make an outgoing call), the call will have two entries in the tree, but the entries refer to the same call instance.

The pPendingCallList attribute contains a pointer to the base of the tree that contains the ports from which pagers are being called, but the calling party has hung up. They are kept here so that the ports involved in the call can be torn down after the page completes without having to keep the call instance active.

The COSDSswitch class is inherited from the COswitch class and processes the actions from AEX 115 and reports from SDS 160. Illustrative methods performed by conversion process 150 on the COSDSswitch class include:

The static set and get methods record and fetch the values for the static variables associated with the class. These variables contain the various control algorithms to dial a call, dial a pager base, dial voice mail for a subscriber, dial voice mail for a non-subscriber, the size of the shared memory segment, etc.

The processMsg method is a method used to process any incoming message. This will call one of the other message processing methods for the class, depending on the message type.

The deleteCall method removes a call from the call list as well as any other lists in which its ports and callid may reside.

The processEDSinfo method handles all operations on an eds!info action. It fills in the callid field in the call instance, changes the state to SA active and sends an eds!info_completed message back to the requesting SA 110. If the prior state was second dial tone wait, the complete message will contain "second dial tone" as the call type. If the prior state was voice wait, the complete message will contain "voice" as the call type. Otherwise, the complete message contains "new" as the call type.

The processEDScall method handles an eds!call action. It calls the placeCall method to place a call using the outpulse rule in DialOutpulseRule, a phantom incoming port or the incoming port specified in the message and either the outgoing port specified in the message or the outgoing port resource group specified in the message.

The processEDSconnectPort method handles an eds!connect action. It formats an outgoing port control ($69) command and sends it to SDS 160. For more information on the parameters sent in the commands to SDS 160, refer to Appendix D.

The processEDSteardownPort method handles an eds!teardown_port action. It formats an outgoing port control ($69) command and sends it to SDS 160.

The processEDSquietPort method handles an eds!quiet_port action. It formats a voice path control ($66) command and sends it to SDS 160.

The processEDScallVM method handles an eds!call_vm action. It calls the placeCall method to place a call using the outpulse rule in attribute SubVMOpulseRule (if call type is "voice") or VMOpulseRule (if call type is not "voice"), a phantom incoming port, and either the outgoing port specified in the message or the outgoing port resource group specified in the message.

The processEDSconnectVoice method handles an eds!connect_voice action. It formats a voice path control ($66) command and sends it to SDS 160.

The processEDSpageDisplay method handles an eds!page_display action. It calls the placeCall method with outpUlse rule of PagerOutpulseRule+pager type from the message, a phantom incoming port, and either the outgoing port specified in the message or the outgoing port resource group specified in the message.

The processEDSpageTone method handles the eds!page_tone action in the same manner the processEDSpageDisplay method handles the eds!page_display action.

The processEDSpageVoice method handles the eds!page_voice action in the same manner the processEDSpageDisplay method handles the eds!page_display action.

The processEDScancelCall method handles the eds!cancel_call action. It will abort any type of call that is in progress. The call may have been placed by any of the eds!call, eds!call_vm, eds!page_tone, eds!page_display or eds!page_voice actions. It will call the teardownPorts method to issue a teardown command and remove the ports from the call and outgoing port lists.

The processSCsetCid method handles the resource!assign action. It transfers control of the ports of the requesting SA 110 to the call specified in the message. It then removes the call instance for the requesting SA 110.

The processSCdealloc method handles the action received when SA 110 shuts down. If the state of the call is not "second dial tone" or "voice mail", then the deleteCall method is executed to remove the call instance. Otherwise, the callid is removed from the active call list.

The processSDSrpt method first parses the message from SDS 160. If the message was an echoed command, the status of the command is checked. If the status is successful, then the associated instance call is found using the findCall method. If there is an outstanding action for the call and a report is needed before it can be determined that an action was successful (as determined by the bWaitingRpt flag), then nothing is done. If there is an outstanding action for the call and a report is not needed to determine if the command is successful, then an acknowledgment event is sent to the respective AEX 115. If the message was a report, one of the following three methods are called.

The processDArpt method handles the outgoing port change of state report. It first finds the associated call by performing searches on the call list and the outgoing port list. If the state of the call is new, second dial tone wait or voice mail wait, and the change was outpulse rule completed, the outgoing port for the call is saved. It then performs actions based on the last action issued for the call, if any. It handles the following prior actions:

eds!call: If the state is "outpulse rule completed", an eds!call_proceeding event is sent back to AEX 115. If the state is "off-hook", an eds!answered event is sent back to AEX 115. If the state is "failed", "outpulse rule processing aborted", "supervision detected outside of a rule", "supervision error detected" or "on-hook", then a eds!call_failed event is sent back to AEX 115. If the call failed, then the teardownPorts method is called to release the outgoing and phantom ports.

eds!call_VM: same as eds!call eds!page_voice: same as eds!call, except that this action does not return the eds!call_proceeding event.

eds!page_display, eds!page_tone: If the state is "outpulse rule completed", this action returns the eds!page_display_completed or eds!page_tone_completed events to AEX 115, as required. If the state is "failed", "outpulse rule processing aborted", "supervision detected outside of a rule", "supervision error detected" or "on-hook", the eds!page_dlsplay_failed or eds!page_tone_failed event is sent to AEX 115. In any of the above cases, the teardownPorts method is called to release the outgoing and phantom ports. It preferably should never receive an "off-hook" message for these pager types, so that is ignored.

eds!teardown_port: If the change of state is "on-hook", then the eds!teardown_port_completed event is sent to AEX 115.

Regardless of any prior actions that are processed, if the change of state was on-hook, then the outgoing port is removed from the outgoing port list. Also, if the change of state was on-hook for a second dial tone or voice mail call, then the placeCall method is called to redial SCN 120 and the call is placed in second dial tone wait or voice mail wait state.

The processDBrpt method handles the incoming port change of state report. It first finds the call by searching the call tree. If no cali instance is found, nothing is done. If a call instance is found, an eds!teardown_port action is outstanding and the change is on-hook, then an eds!teardown_port_completed event is sent back to the SA. If the change is on-hook for the incoming port of a call, then the deleteCall method is executed to remove the call instance.

The processDDrpt method handles the executed report resulting from an incoming call. It creates a node in the incoming call tree for the call. It records the universal number dialed, the incoming port and sets the call state to new.

The teardownPorts method issues a command to SDS 160 to tear down the incoming and/or outgoing ports. If an outgoing port in setup mode (not attached to an incoming port) is being torn down, an outgoing port control ($69) command is issued. Otherwise, an incoming port control ($6A) command is issued. It also removes the entries for the outgoing port list and call list, as required.

The issueCmd methods fills in the network header for an SDS command and sends the command to SDS 160. It records the action that resulted in the command in the nlLastAction attribute.

Conversion process 150 receives all action messages from AEX 115; therefore, such messages preferably use the SCschSpec base class when defining the messages. This base class contains information on what SA 110 and what call within SA 110 the message was sent for. Examples of actions messages conversion process 150 may receive include: "info" (SA 110 seeking additional information regarding a call), "call" (SA 110 requesting SDS 160 make an outbound call), "call_vm" (SA 110 requesting SDS 160 make an outbound call to voice mail), "teardown_port" (SA 110 directing SDS 160 to remove link between incoming and outgoing port, and optionally leave one or both ports in set up state), "quiet_port" (SA 110 directing SDS 160 to have a port listen to quiet while the call is being connected), "connect_port" (SA 110 directing SDS 160 to hairpin an incoming and outgoing port), among others. See Appendix D, attached hereto for additional information regarding these and other example action messages.

Another type of input to conversion process 150 is the reports from SDS 160. The attributes for the message are:

msg_type—(TcpConvertMsg)

size—size used in data buffer data—buffer to hold report from switch

Conversion process 150 outputs event messages. Several event types are sent from conversion process 150 to SA 110, in response to the actions described above. Their classes are all inherited from their associated actions, except for the "answered" and "call_proceeding" events, which have separate class definitions. Appendix E illustrates example events conversion process 150 will send to SA 110. The commands for SDS 160 are preferably sent using the same class that the reports from the same switch use.

Conversion process 150 also handles interfacing with many types of pagers and voice mail systems. Most of the control of the interface is on SDS 160. Conversion process 150 supplies the digit string(s) that need to be outpulsed and the control algorithms of SDS 160 determine when they are to be outpulsed and handle any detection of tones, prompts, etc.

More specifically, when paging, preferably field 1 contains the number of the pager to be dialed, field 2 contains the pin or mailbox number, field 3 contains the dial back number and field 4 is unused. If a certain type of pager does not use a pin and/or dial back number, SDS 160 does not outpulse that field. For voice mail, separate control algorithms are used when dialing for a subscriber and when dialing for a non-subscriber. When calling voice mail, field 1 will contain the number to dial and field 2 will contain the mailbox number.

As was the case with TCP/IP SCH 140, the configuration data needed for conversion process 150 is preferably provided within an ASCII file that is read at startup time. The following are descriptions of example configuration parameters for conversion process 150:

OutPulseRule—The Outpulse rule parameter specifies the control algorithm to use on SDS 160 to place an outbound call that does not go to voice mail or a paging terminal.

VoiceOutpulseRule—The voice mail Outpulse rule parameter specifies the control algorithm to use on SDS 160 when connecting a calling party to a subscriber's voice mail system.

SubVoiceOutpulseRule—The subscriber voice mail Outpulse rule parameter contains the control algorithm to use when connecting a subscriber to their voice mail.

PagerOutpulseRuleBase—The pager Outpulse rule base parameter is the number that is added to the pager type to determine what control algorithm is used to dial the paging terminal. One control algorithm is used for each pager type.

SharedMemorySize—The shared memory size is the amount in bytes of shared memory that the process will need. The shared memory will store all information concerning the host switches 160 and active calls. The process needs 150 bytes for each call that may be active in the system at any time, plus a base size of 1000 bytes.

An Example of an actual conversion process configuration file can be found in Appendix B attached hereto.

The user interface for the present invention is preferably defined as a Human Machine Interface (HMI) that can send messages from the console (not shown) to TCP/IP SCH 140. These messages will request SCH 140 to return information or perform a specific task. The HMI used to communicate with TCP/IP SCH 140 is preferably the Local Maintenance Terminal (LMT), provided by AT&T.

Figure 3:
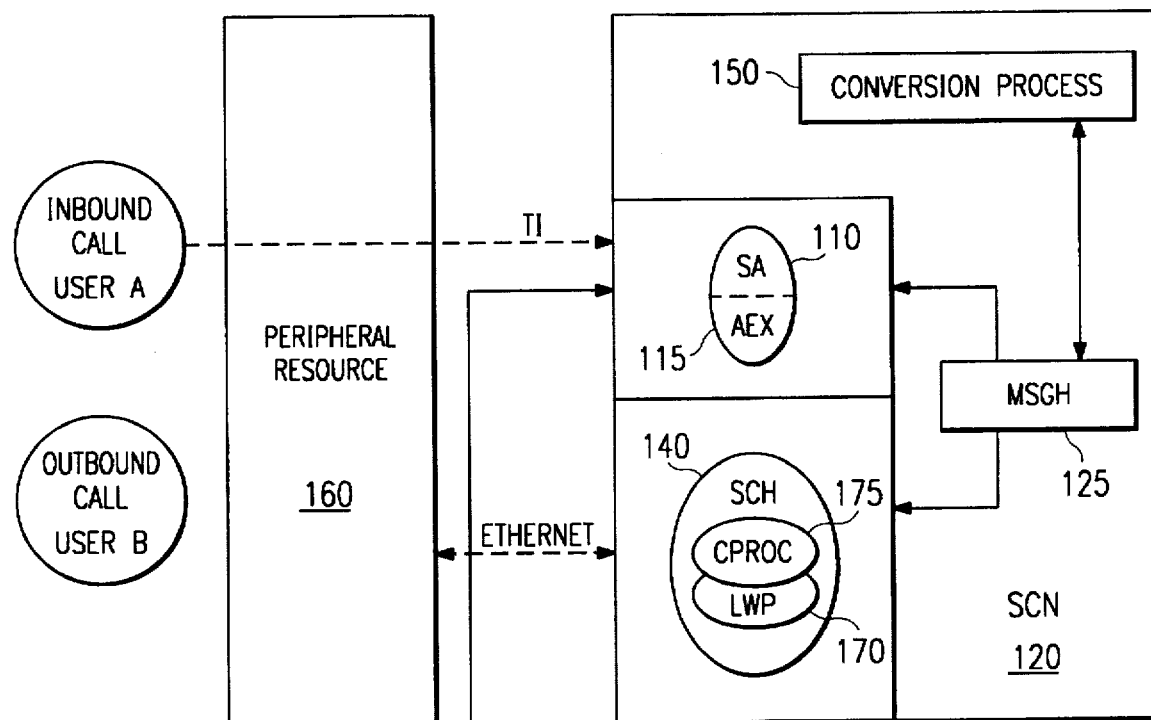
FIG. 3 is a block diagram illustrating a system including a service node with the present invention implemented therein and an external switch associated therewith, said system receiving an inbound call.

To better illustrated a preferred embodiment of the present invention, consider FIG. 3. User "A" dials a telephone number, such as a "universal" number, as was described earlier. User A's call is received by SDS 160 which preferably sends a report (also referred to as "DD report" herein) to SCH 140 indicating that a new call has been received by SDS 160. The DD report preferably contains SDS 160 port information and the universal number associated with the call. LWP 175 forwards the DD report to conversion process 150 which in turn creates an entry in its link list. Meanwhile SDS 160 uses its internal operating system, along with its control algorithms to "dial" the universal telephone number received from the inbound call of User A to "call" SCN 120. The T1 connection between SCN 120 and SDS 160 transparently forwards external callers from SDS 160 to SCN 120. As a result of calling SCN 120, SDS 160 sends an outgoing port change of state (also referred to as "DA" or "$DA" herein) report to SCH 140 over the TCP/IP signalling link. The DA report is received by LWP 175 within SCH 140, which process in turn forwards the message to conversion process 150. The DA report preferably contains SDS 160 port information that single number reach type SA 110 will require to manage the call according to its application logic. As a result, selected information from the DA report is kept in a linked list by conversion process 150 for future processing.

Specifically, the relevant service application (SA) 110 requests information about the new call from conversion process 150. SA 110 communicates with conversion process 150 by directing AEX 115 to format an action request. This action request is then sent to conversion process 150 via MSGH process 125. The call information requested will preferably include which SDS 160 port that User A's call came in on and what type of call User A's call is. While the types of call can include "second dial tone", "voice mail", "pager", "new", etc., it should be understood that many types of calls can be accommodated with the present invention and that such list should in no way limit the scope of the invention. In the present example, the type of call is designated "new".

Conversion process 150 returns the requested call information as an event message to SA 110 via MSGH process to AEX 115. AEX 115 converts the message for SA 110 to understand. In response to the message, SA 110 requests SCH 140 to perform an outgoing call. To make this request, SA 110 passes the request to AEX 115, which formats it into an action request and forwards the request to conversion process 150. Conversion process 150 converts the request into a command message format understandable by SDS 160 and sends the message to SCH 140.

CPROC 170 receives the message and forwards the command message to SDS 160 to perform an outgoing call. The command message contains the specific port information that SDS 160 requires to place the outgoing call to User "B". SDS 160 preferably receives the universal number along with the number being dialed when an outbound call is processed. The universal number will be placed as additional data in the $6A command to SDS 160. The SDS 160 control algorithms that process the $6A command will pulse the universal number out as additional data when establishing the initial outbound phone call.

Figure 4:
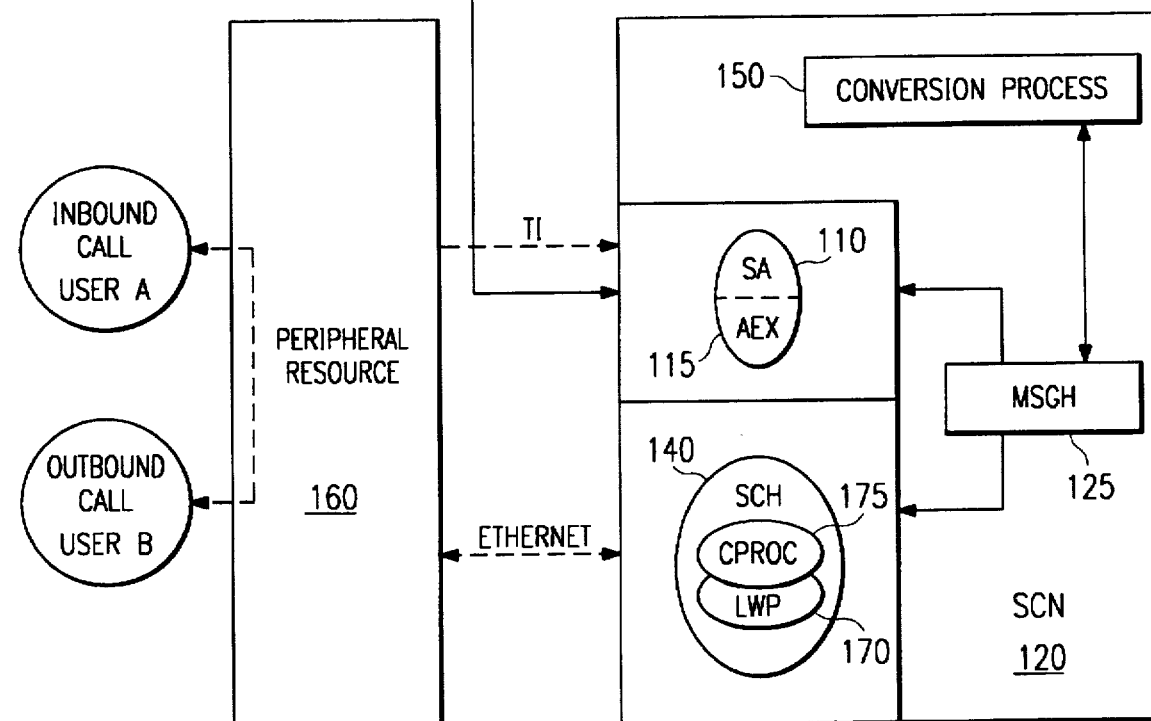
FIG. 4 is a block diagram illustrating a system including a service node with the present invention implemented therein and an external switch associated therewith, after an inbound call and an outbound call have been connected.

Looking now at FIG. 4, SDS 160 makes the outgoing call and User B picks up the phone to answer the incoming call.

SDS 160 then sends a $DA report to SCH 140 that the call was successfully connected. LWP 175 receives the $DA report and forwards it to conversion process 150. Conversion process 150 updates its linked list entry to indicate that the call was successfully connected, and forwards the report back to AEX 115 as an event message. AEX 115 reformats the message so SA 110 will understand it.

In response to the message that the call between SDS 160 and User B was successfully connected, SA 110 requests SCH 140 to "hairpin" User A to User B. This request is directed to AEX 115 which formats it into an action request and forwards the message to conversion process 150. Conversion process 150 in turn converts the message to a command message SDS 160 will understand and forwards it to CPROC 170. CPROC 170 sends the command message to SDS 160 to "hairpin" the two callers together.

SDS 160 connects the two callers and sends an echoed command report with status to SCH 140 that the connection between callers was successful. LWP 175 returns the report to conversion process 150, which in turn forwards the confirmation report back to AEX 115 as an event message. In response to this message, SA 110 sends a return message to SCH 140 that its call instance is shutting down, which results in freeing up the memory space and port associated with managing the call. The hairpinned call is stored or parked in the switch fabric of SDS 160 and it resides there until the call is terminated, at which time the switch fabric and ports of SDS 160 employed during the call are made available for another call.

Now for the sake of illustration, assume the call type had been designated by SDS 160 as "second dial tone". Everything would have proceeded exactly as before, with command and event messages, action requests and reports communicated between SA 120 and SCH 140 as described above. However, at the point that User B puts his phone back on-hook, thereby breaking the hairpinned connection between Users A and B residing on SDS 160, SDS 160 sends a $DA report to LWP 175 that User B has gone back on-hook. The report is forwarded to conversion process 150 which in turn formats a command and sends the message to SDS 160 via SCH 140 to redial SCN 120. SDS 160 then "calls" SCN 120. This action, when performed by SDS 160, effectively reconnects User A with SCN 120, and starts a new instance of SA 110 to be associated with the incoming call. As before, SDS 160 "dials" the universal telephone number received from User A to "call" SCN 120. It should be understood that this sequence of events may be repeated over and over again as often as User A desires to make yet another call.

It should be understood by those skilled in the art that the present description is provided only by way of illustrative example and should in no manner be construed to limit the invention as described herein. Numerous modifications and alternate embodiments of the invention will occur to those skilled in the art. Accordingly, it is intended that the invention be limited only in terms of the following claims:

Appendix - A

Sample configuration file for the TCP/IP Service Circuit Handler, TCPSCH process.

NOTE:   Any line preceded by a '#' is a comment.

```
###############################################################
#                                                             #
#   Configuration file for the TCP/IP Service Circuit Handler #
#                                                             #
###############################################################

# Host name to get out of the /etc/hosts file.  The name in the /etc/host
# file will have a numeric after the name, ie. Summa1.  If there is a primary
# and secondary Ethernet connection the name will be Summa1a and Summa1b.

HostName                = Summa

# This field indicates if the remote host has redundant Ethernet
# capabilities.  A '1' indicates YES and '0' indicates NO.

RedundantHost           = 0

# This field indicates the amount of time to wait before trying
# to reconnect to a host that failed to connect during initialization.
# This field is measured in seconds.  The valid range is from
# 1 to 1800 seconds (30 minutes).

ReconnectTimer          = 60

# This field indicates the amount of time to wait before trying
# to 'ping' the remote host.
# This field is measured in seconds.  The valid range is from
# 1 to 300 seconds (5 minutes).

PingTimer               = 60

# This field indicates the amount of time to wait between checking
# the Ethernet socket between the Summa and the SCN for new data.
# This field is measured in milliseconds.  The valid range is from
```

29

```
# 1 to 20000 milliseconds.  1000 equals 1 second.

EthernetPollTimer            = 100

# This field indicates the number of consecutive reads to perform
# against a single socket before returning from the READ function.  If
# there is no data in the socket the function will return before the
# number specified below.  The valid range is from 1 to 20 reads.

SocketReadAttempts           = 3

List of all the valid socket names on the Summa box

Port                         = 2000
Port                         = 2001
Port                         = 2002
Port                         = 2003
Port                         = 2004
```

*APPENDIX B*

This appendix illustrates examples of the classes preferably used within the SCH 140 process.

Class TCP

The TCP class is the base class definition for UNIX TCP/IP socket communications.

```
class TCP
{
        public:     // Functions

TCP             (void);        // Set HostName to NULL
                TCP             (char *);      // Save HostName
```

- The CheckForHost member function will check the /etc/hosts file for the HostName parameter. Retrieve the IP address if found.

```
        int CheckForHost   (void);
```

- The GetPortNumber member function will return the port number of the host to the caller.

```
        int GetPortNumber (void);      // Return Port parameter
```

- The GetData member function will read data from the Ethernet socket and place the results in a buffer supplied by the caller.

```
        int GetData       (void*, unsigned int);
```

- The SendData member function will write data to the Ethernet socket.

```
        int SendData      (void*, unsigned int, int = 0);
        int CloseSocket   (void);      // Close the UNIX socket
```

- The FDSet member function allows the socket FD to be used with a Select statement..

```
        int FDSet(int);
```

- The FDTest member function will test the socket FD to see if a message is pending on the socket.

```
            int FDTest(void);

protected:  // Functions int OpenSocket   (void);    // Open the TCP device

•   The Connect member function will establish the link between the SCN
            and the SUMMA 4 using the port number supplied.
            int Connect     (int);

private:    // Data
            char HostName   [40];
            char Address    [ADDRSIZE];
            int  Port;
            int  SocketFD;
};
```

Class SUMMA

The SUMMA class is derived from the TCP base class. This class performs TCP actions that are specific to the external host, in this case specialty digital switch such as those sold by Summa Four. It should be understood that the TCP actions listed here would vary as the external host vary by manufacturer.

```
class SUMMA : public TCP
{
        public:    // Functions
                SUMMA           (void);    // Set NumPorts to zero

•   The SUMMA constructor calls the TCP constructor passing the char
            * HostName received.
                SUMMA           (char*);

•   The AddPort member function will add a port to the list of that are
            vailid connection points on the Summa Four.
        int AddPort     (int);

•   The GetConnection member function will attempt to connect to the
            Summa Four using the ports supplied in the port list.
        int GetConnection (void);

•   The savePingMsg member function will save the data portion of the
            message received. The data portion is the 'ping' message type that the
            remote host is expecting. This message is used to determine that the
            Ethernet connection is active.
        void savePingMsg (char *, short );

private:   // Data
                int NumPorts;
                int Ports   [10];
};
```

Class MessageBase

The MessageBase class is derived from the SCschSpec class. The SCschSpec class is used by all SCN 120 applications that need to communicate with SCH 140.

```
class MessageBase : public SCschSpec
{
    public: // Functions
        •   The MessageBase constructor calls the SCschSpec constructor. The
            arguments for the constructor are the host socket, length of data, and
            a pointer to the data buffer. The constructor allocates memory for the
            data buffer.
        MessageBase (Short, Short, char *) : SCschSpec ();

GLretVal send (char *, short, long)

GLretVal send (Short, short, long)

•   The send member function sends the message to the destination
            process. The arguments are the destination queue ID, sent queue, and
            timeout value.
        GLretVal    send    (Short, Short, long);

•   The send member function sends the message to the destination
            process. The arguments are the destination queue name, sent queue,
            and timeout value.
        GLretVal    send    (char *, Short, long);

public: // Data
        Short       nsHost;     // Socket connected to host
        Short       nsLength;   // Length of spData field
        char        szData [512]; // Data from/to host
};
```

34

*Appendix C*

Sample Configuration file for the Conversion process, CONV process.
NOTE:   Any line preceded by a '#' is a comment.

```
###############################################################
#                                                             #
#    Sample Configuration file for the Conversion process     #
#                                                             #
###############################################################

# The Outpulse rule specifies the Outpulse rule to use on the Summa
switch
# to place an outbound call that does not go to voice mail or a paging
terminal OutPulseRule                    = 3

The voice mail Outpulse rule specifies the Outpulse rule to use on
# the Summa when connecting a calling party to a subscriber's voice
# mail system.

VoiceOutpulseRule               = 8

# The subscriber voice mail Outpulse rule contains the Outpulse
rule to use when connecting a subscriber to their voice mail SubVoiceOutpulseRule            = 12

The pager Outpulse rule base is the number that is added to the
# pager type to determine what Outpulse rule is used to dial the
# paging terminal.  One Outpulse rule is used for each pager type.

PagerOutpulseRuleBase           = 5

# The shared memory size is the amount in bytes of shared memory
# that the process will need.  The shared memory will store all
# information on the host switches and active calls.  The process
# needs 150 bytes for each call that may be active in the system
# at any one time plus a base size of 1000 bytes.  The
```

```
# value of 100,000 will support 660 calls.

SharedMemorySize        = 100000
```

Appendix D

Parameters of Action Commands Sent to SDS 160 from Conversion Process 150

This Appendix describes a number of different command types sent to SDS 160 by conversion process 150, and the expected SDS 160 DA report (response). Please note that in some cases the parameters in filled in differently depending upon the parameters sent in the actions.

Action: eds!connect_voice

The connect voice action will connect two voice paths.

Parameters received:

port 1 address - port_1
port 2 address - port_2

Command type: voice path control ($66)

Command Parameters:

Path control modifier - 2 (two-way connection)
A address - port_1
B address - port_2

SDS Response:

None

****************************************************************

Action: eds!quiet_port

The quiet action will make a port listen to quiet .

Parameters received:

port address - port

Command type: voice path control ($66)

Command Parameters:

Path control modifier - 1 (one-way connection)
    A address - port
    B address - $04C0 (quiet)

SDS Response:

None

Action: eds!connect_port

The connect action will hairpin an incoming and outgoing port.

Parameters received:
    incoming port address - i_port
    outgoing port address - o_port
    call type - (new, second_dt, voice)

Command type: outgoing port control ($69)

Command Parameters:
    Controlling port address - i_port
    Outgoing port Control Code - 110000000
    S = 1 (switching action required)
    A = 1 (link resource)
    P = 0 (use port specified in command)
    VV = 00 (connect incoming and outgoing ports immediately)
    Outgoing port address - o_port
    Rule control - 0100000
    X = 0 (no outpulse rule)
    N = 1 (disconnect control byte attached)
    I = 0 (no inpulse rule)
    RRRRR = 0 (null rule number)
    Disconnect control (attach mode) - 00000x00
    T = 0 (on hook report generated for outgoing port)
    I = 0 (force incoming port idle - if call_type = new )
    I = 1 (force incoming port to set up - if call_type = second_dt or voice)
    C = 0 (on hook report generated for incoming port)
    U = 0 (force outgoing port to idle when incoming port goes on hook)
    Outpulse control segment - 0 (no outpulse rule executed)

SDS Response:   None.

Actions: eds!call, eds!page_display, eds!page_tone, eds!page_voice, eds!call_vm

The call action will seize an outgoing port (or use one that is in set up mode) and place a call. The command will use a virtual port as the incoming port. It dials whatever strings of the ani, digit_str_1, digit_str_2, digit_str_3 and digit_str_4 are set.

Parameters received:

outgoing port address - o_port
    OR
    outgoing port resource group - o_port_res_grp calling digits - ani, digit_str_1, digit_str_2, digit_str_3, digit_str_4
    outpulse rule - o_rule Command type: incoming port control ($6A) with embedded outgoing port control ($69)

Command Parameters :

Controlling port address - $FE (virtual port generation)
    Incoming port control code - 11100000
    S = 1 (switching action required)
    A = 1 (forced origination of call)
    P = 1 (incoming port is a resource group)
    T = 0 (bit ignored)
    I = 0 (force incoming to idle)
    C = 0 (on-hook reported for outgoing)
    U = 0 (force outgoing to idle)
    Rule control - 00000000
    I = 0 (no inpulse rule)
    U = 0 (no outpulse rule)
    RRRR = 0 (null rule)
    Segment control code - 00001000
    C = 0 (no Port Supervision Control command segment attached)

D = 0 (no DTMF Collection Control command segment attached)

M = 0 (no MF Collection Control command segment attached)

A = 0 (no Voice Port Control command segment attached)

P = 1 (Outgoing Port Control command segment attached)

S = 0 (no Speech Collection Control command segment attached)

D = 0 (no Outpulse Rule Control command segments attached)

Outgoing Port Control Command Segment

Outgoing Port Control Code - 11000000

S = 1 (switching action required)

A = 1 (attach outgoing port)

P = 0 (use outgoing port address given - if using o_port)

P = 1 (outgoing port is resource group - if using o_port_res_group)

VV = 0 (cut through path after outpulsing)

Outgoing Port Address = o_port or o_port_res_group

Outpulse Rule Control = 1000xxxx

X = 1 (execute outpulse rule)

N = 0 (no disconnect control byte)

I = 0 (no inpulse Rule)

RRRR = o_rule (outpulse rule number)

An Outpulse Control segment will be attached for each of ani, digit_str_1, digit_str_2, digit_str_3 and digit_str_4 that are included. The field numbers used for each string will be 0, 1, 2, 3 and 4 respectively.

SDS Response:

One or two outgoing port change of state reports ($DA) will be generated. One will be generated with a change of outpulse rule complete when the outpulse rule is finished and one may also be generated with a change of off-hook depending upon the tokens in the outpulse rule utilized.

Action: eds!teardown_port

The teardown action will remove the link between an incoming and outgoing port and optionally
leave one or both ports in set up state.

Parameters received:

incoming port address - i_port incoming port set up flag - iport_setup_flag outgoing port set up flag - oport_setup_flag Command type: $6A (incoming port control)

Command Parameters (note that the outgoing port in not included in the command):

Controlling port address - i_port

Incoming port control code - 1000x0x0

S = 1 (switching action required)

A = 0 (remove resource/tear down call)

P = 0 (use address given)

T = 0 (on-hook and PSC clear reported for incoming)

I = iport_setup_flag

C = 0 (on-hook reported for outgoing)

U = oport_setup_flag

Rule control - 00000000

I = 0 (no inpulse rule)

U = 0 (no outpulse rule)

RRRR = 0 (null rule - seize only)

Segment control code - 0

NO optional segments

SDS Response: The SDS will respond with an incoming port change of state ($DB) report if the incoming port was not a virtual port and the port is not left in set up state. The SDS will also respond with an outgoing port change of state ($DA) report, if an outgoing port was attached and is not left in setup mode.

Action: none

This command is sent after a second dial tone or voice mail call when the called party hangs up and the subscriber needs to be reconnected to the SCN.

Parameters received:

incoming port - i_port
universal number - digit_str
outpulse rule - opul_rule
outgoing port resource group - oport_res_group

Command type: outgoing port control ($69)

Command Parameters :

controlling port address - i_port
outgoing port address - o_port
Outgoing port control code - 11100
S = 1 (switching action required)
A = 1 (forced origination of call)
P = 1 (outgoing port is a resource group)
VV = 0 (cut through path after outpulsing)
Outgoing port address = oport_res_group
Rule control - 1000xxxx
X = 1 (execute outpulse rule)
N = 0 (no disconnect control byte)
I = 0 (no inpulse Rule)
Outpulse Control Segment 1
Digit Outpulse Control = 001xxxxx
F = 1 (field 1)
N = (length of) digit_str Digit string = digit_str Outpulse Control Segment 2

Digit Outpulse Control = 0 (signifies no more outpulse control segments)

SDS Response:

One or two outgoing port change of state reports ($DA) will be generated. One will be generated with a change of outpulse rule complete when the outpulse rule is finished and one may also be generated with a change of off-hook depending upon the tokens in the outpulse rule utilized.

*APPENDIX E*

This appendix illustrates example message types and additional fields in the events sent from conversion process 150 to service application 110 via action executor 115.

| Event | Message type | Field(s) |
|---|---|---|
| eds!info_completed | ESinfoAck | calling_switch_port<br>call_type |
| eds!info_failed | ESinfoFail | failure_reason |
| eds!call_proceeding | EScallProceeding | calling_switch_port<br>out_switch_port |
| eds!answered | ES_answered | calling_switch_port<br>out_switch_port<br>time_stamp |
| eds!call_failed | EScallFail | failure_reason |
| eds!call_vm_failed | EScallVMFail | failure_reason |
| eds!teardown_port_completed | ESteardownPortAck | |
| eds!teardown_port_failed | ESteardownPortFail | failure_reason |
| eds!quiet_port_completed | ESquietPortAck | |
| eds!quiet_port_failed | ESquietPortFail | failure_reason |
| eds!connect_port_completed | ESconnectPortAck | |
| eds!connect_port_failed | ESconnectPortFail | failure_reason |

| | | |
|---|---|---|
| eds!page_display_completed | ESpageDisplayAck | |
| eds!page_display_failed | ESpageDisplayFail | failure_reason |
| eds!page_tone_completed | ESpageToneAck | |
| eds!page_tone_failed | ESpageToneFail | failure_reason |
| eds!page_tone_completed | ESpageToneAck | calling_switch_port<br>out_switch_port |
| eds!page_tone_failed | ESpageToneFail | failure_reason |
| eds!connect_voice_completed | ESconnectVoiceAck | |
| eds!connect_voice_failed | ESconnectVoiceFail | failure_reason |
| eds!cancel_call_completed | EScancelCallAck | |
| eds!cancel_call_failed | EScancelCallFail | failure_reason |
| eds!call_for_transfer_failed | EScallForXferFail | calling_switch_port<br>terminating_dn<br>failure_reason |

46

We claim:

1. A method for increasing service node call capacity, wherein said service node handles incoming and outgoing communications, comprising the steps of:
   a) receiving an incoming call into a peripheral resource connected to and external to a service node containing at least one service application and a service circuit handler for communicating with said peripheral resource;
   b) creating an instance of said service application on said service node associated with said incoming call;
   c) formatting, by said service application, an action request for said peripheral resource to place a corresponding outgoing call;
   d) placing, by said peripheral resource external host, said outgoing call;
   e) hairpinning, by said peripheral resource, said incoming and outgoing calls together;
   f) parking said hairpinned calls in said peripheral resource's switch fabric until one of said hairpinned calls reports an on-hook condition;
   g) notifying, by said peripheral resource, said service application of successful connection of said incoming and outgoing calls; and
   h) tearing down by said service node of said instance of the incoming call, thereby releasing the associated memory supporting said instance, and the connection between the service node and the peripheral resource, without disturbing said hairpinned calls.

2. The method for increasing service node call capacity of claim 1, after said step of parking said hairpinned calls, further comprising the step of notifying, by said peripheral resource, said service application of successful connection of said incoming and outgoing calls.

3. The method for increasing service node call capacity of claim 1, wherein said service application is a single number reach type telecommunications application.

4. The method for increasing service node call capacity of claim 1, wherein said peripheral resource is at least one switch.

5. The method for increasing service node call capacity of claim 1, wherein said peripheral resource is a billing system.

6. The method for increasing service node call capacity of claim 1, wherein said peripheral resource is a paging system.

7. The method for increasing service node call capacity of claim 1, wherein said peripheral resource is a voice mail system.

8. A method for increasing service node call capacity, wherein said service node handles incoming and outgoing communications, comprising the steps of:
   a) receiving an incoming call into a transmission control protocol/Internet protocol (TCP/IP)-driven host connected to and external to a service node containing at least one service application and a TCP/IP service circuit handler for communicating with said TCP/IP-driven host;
   b) creating an instance of said service application on said service node associated with said incoming call;
   c) formatting, by said service application, an action request for said TCP/IP-driven host to place a corresponding outgoing call;
   d) placing, by said TCP/IP-driven host, said outgoing call of step c);
   e) hairpinning, by said TCP/IP-driven host, said incoming and outgoing calls together;
   f) parking said hairpinned calls in said TCP/IP-driven host's switch fabric until one of said hairpinned calls reports an on-hook condition;
   g) notifying, by said TCP/IP-driven host, said service application of successful connection of said incoming and outgoing calls; and
   h) tearing down by said service node of said instance, thereby releasing the associated memory supporting said instance, and the connection between the service node and the TCP/IP-driven host, without disturbing said hairpinned calls.

9. The method for increasing service node call capacity of claim 8, wherein said step of notifying further comprises the concurrent step of keeping said incoming call resident on said TCP/IP-driven host.

10. The method for increasing service node call capacity of claim 8, wherein said TCP/IP-driven host is a switch.

11. The method for increasing service node call capacity of claim 8, after said step of tearing down said hairpinned calls, further comprising the steps of:
   j) determining that said outgoing call has reported an on-hook condition;
   k) maintaining said incoming call resident on said TCP/IP-driven host;
   l) notifying said service node of said incoming call's request for additional service;
   m) repeating steps b) through h); and
   n) repeating steps j) through m) as often as requested by said incoming call.

12. The method for increasing service node call capacity of claim 11, wherein said additional service is a request to be connected to voice mail.

13. The method for increasing service node call capacity of claim 11, wherein said additional service is a request to place another outgoing call.

* * * * *